Jan. 16, 1951 G. HILLER 2,538,245
WELDING ELECTRODE HOLDER SWITCH
Filed Oct. 19, 1946
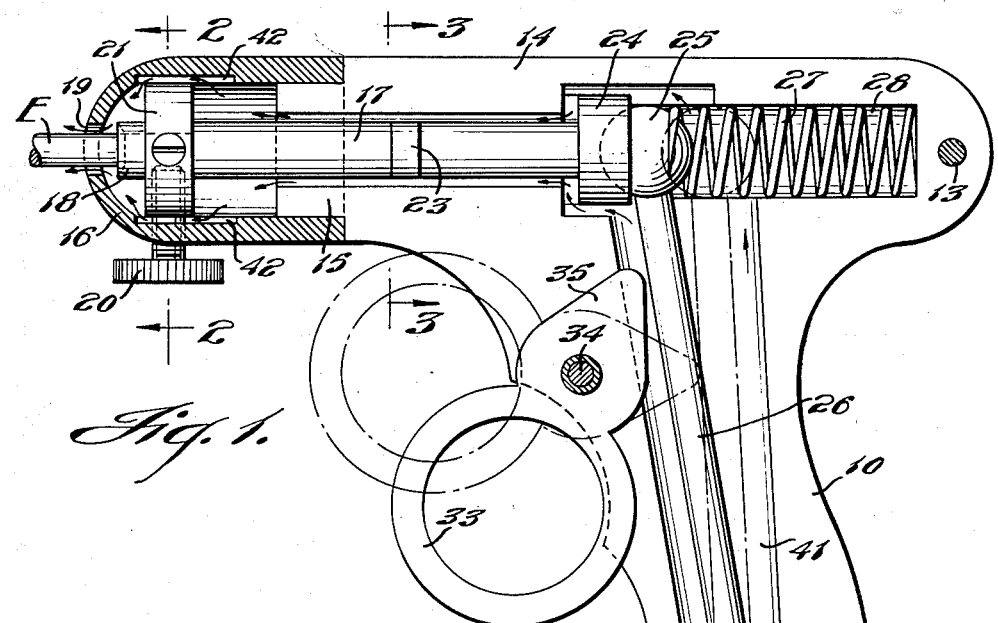
Fig. 1.
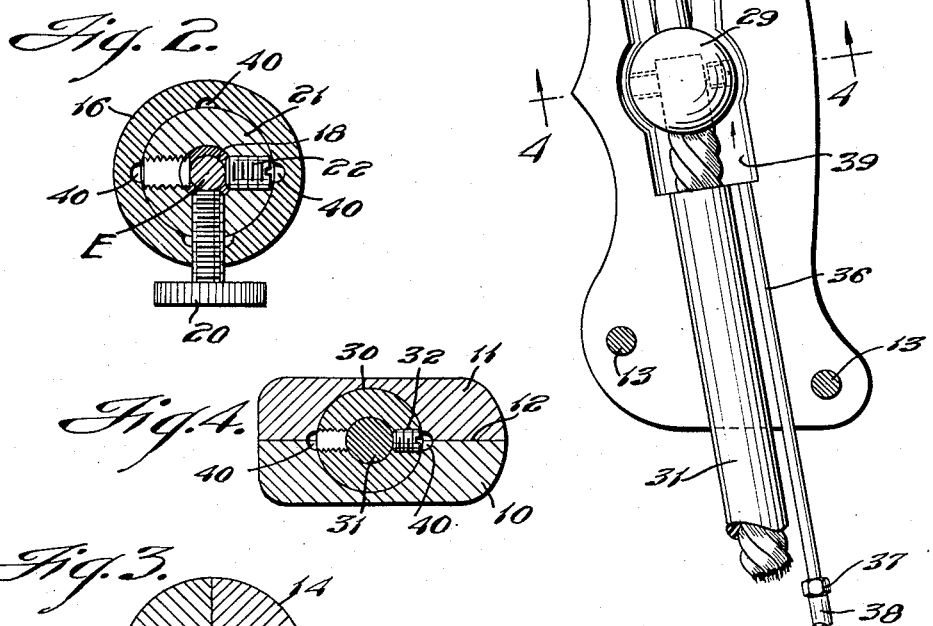
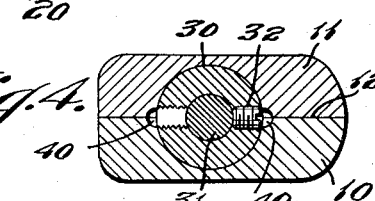
Fig. 2.
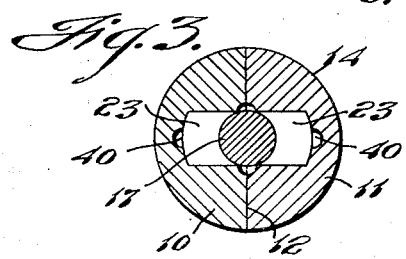
Fig. 4.
Fig. 3.
INVENTOR
GUSTAVE HILLER
BY Hazard & Miller
ATTORNEY Patented Jan. 16, 1951

2,538,245

UNITED STATES PATENT OFFICE 2,538,245

WELDING ELECTRODE HOLDER SWITCH

Gustave Hiller, Los Angeles, Calif., assignor to Edward R. McHugh, Los Angeles, Calif.

Application October 19, 1946, Serial No. 704,466

3 Claims. (Cl. 200—157)

This invention relates to improvements in welding electrode holders and may be regarded as an improvement over the disclosure in my prior U. S. Letters Patent No. 2,378,707, issued June 19, 1945.

A primary object of the present invention is to provide an improved welding electrode holder wherein there is means for gripping and holding a welding rod and establishing an electric circuit between the rod and the cable delivering current thereto from a welding generator and wherein provision is made for discharging a blast of a compressed gas which may either be air or a relatively inert gas. The direction of discharge of this compressed gas is lengthwise of the welding rod and serves to blow away and dissipate objectionable smoke and toxic fumes. Both smoke and fumes are frequently present in certain welding operations particularly when the welding rod has a flux coating, and toxic fumes are frequently generated with certain types of metals in the course of the welding operation. By means of the improved construction, as the air or inert gas is discharged longitudinally around the welding rod, the smoke and fumes are dissipated or scattered regardless of the extent to which the rod may have been consumed during the welding operation.

Another object of the invention is to provide an improved welding electrode holder consisting of a pistol-shaped body having a barrel portion and a pistol grip, wherein the welding rod is detachably mounted at the forward end of the barrel portion, and the cable connection from the welding generator leads into the bottom of the pistol grip. In accordance with the present invention a trigger is pivotally mounted on the forward side of the grip and operates a contactor for making and breaking the electric circuit between the cable connection and the welding rod. The trigger is so arranged that it will be normally urged into either of two extreme positions one of which will indicate that the electric circuit has been completed to the welding rod and the other of which indicates that it has been broken.

Still a further object of the invention is to provide an improved welding electrode holder which is of relatively simple and durable construction and which can be economically manufactured and assembled and to provide a novel and advantageous contactor for establishing the electrical connection between the cable and the welding rod.

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through the improved welding electrode holder embodying the present invention;

Fig. 2 is a sectional view taken substantially upon the line 2—2 upon Fig. 1 in the direction indicated;

Fig. 3 is a sectional view taken substantially upon the line 3—3 upon Fig. 1 in the direction indicated; and Fig. 4 is a sectional view taken substantially upon the line 4—4 upon Fig. 1 in the direction indicated.

Referring to the accompanying drawings wherein similar reference characters designate similar parts throughout, the improved electrode holder consists of a somewhat generally pistol-shaped body made up primarily of three parts. Two of the parts, indicated at 10 and 11, are counterparts of each other and are adapted to be secured together in abutting relation on a central parting plane 12 by means of transversely extending bolts or similar fasteners indicated at 13. These parts provide a downwardly extending grip adapted to be manually grasped by the welder and an upper barrel portion indicated at 14. At the forward end of the barrel portion there is a reduced neck 15 over which a hollow cap 16 is receivable with a friction fit.

Within the barrel portion of the holder there is disposed an electrode mounting means generally indicated at 17. This mounting means is preferably formed of copper or other good conductor and at its forward end it has a socket 18 adapted to receive the end of a welding electrode E. The electrode or welding rod is receivable through an aperture 19 in the cap 16 that is arranged in alignment with the socket. A thumb screw 20 extends through the bottom of the cap 16 and into the side of the socket so as to be capable of being tightened against the electrode E to retain it in the socket. This thumb screw is threaded through a ring 21 that is held on the bar 17 such as by set screws 22 which also enter the socket 18. By adjusting the set screws 22 the size of the socket may be varied to accommodate the various sizes of welding rods.

Intermediate the ends of the electrode mounting 17 there are lateral bosses or wings 23 which enter and fit in recesses formed in the opposed faces of the body members 10 and 11. At the rear end of the mounting 17 there is a contact 24 which has a hemispherical recess formed on its rear face. This contact is engageable by a spherical contact 25 on a contactor 26. A compression spring 27 is seated within opposed recesses 28 in the members 10 and 11 and normally urges the contact 25 forwardly into engagement with the contact 24. The contactor 26 has a spherically-shaped lower end 29 the sides of which rotatably fit in opposed recesses 30 in the members 10 and 11 (see Fig. 4). 31 indicates a cable connection from a welding generator or other source of welding current which extends upwardly through opposed recesses in the body parts 10 and 11 and is secured in a socket adapted to receive its end such as by a set screw 32.

As will be observed from the dotted line showing in Fig. 1, the contactor 26 may swing about the center of the spherical lower end 29 from the full line position shown to the dotted line position shown. This movement is accomplished by means of a trigger 33 pivotally mounted as at 34 between the body parts 10 and 11. This trigger has integral therewith a cam 35 that is engageable with the forward side of the contactor 26. The arrangement of the cam 35 is such that the trigger will be normally urged into either of two extreme positions by the pressure of the spring 27 urging the contactor 26 forwardly. In one of these extreme positions illustrated in dotted lines on Fig. 1, the trigger is uppermost, engaging the top of recesses adapted to accommodate it, formed in the body parts 10 and 11. This position of the trigger indicates that the contactor 26 has been forced rearwardly by cam 35 against the action of the compression spring 27 and that the electrical connection between the cable connection 31 and the electrode E is broken. Conversely, when the trigger 33 is in its lowermost position, illustrated in full lines, this indicates that the contactor 26 has been allowed to be forced forwardly by the compression spring 27 and that the electrical connection has been made between contacts 24 and 25. In this manner a welder may visually ascertain at all times whether the electrode E is in circuit with the generator and if he desires to lay down the electrode holder on a grounded surface he can ascertain visually whether this can be done without forming an arc between the electrode E and the grounded surface.

Adjacent the inlet for the cable connection 31 there is disposed a tube 36 equipped with a connection 37 to an air hose 38 or other supply of compressed gas. This tube conducts the air or compressed gas into the cavity 39 which is below the spherical lower end 29 of the contactor 26. Grooves or ducts 40 that are partially formed in each of the body members 10 and 11 serve to conduct the air or gas around the spherical lower end 29 to an upper chamber or cavity 41 formed in each of the body members. Clearance spaces or ducts serve to conduct the air around the contact 24 and along the mounting 17 to the interior of cap 16. Grooves 42 are formed on the interior of the cap to conduct the air or gas around the ring 21 where it may discharge from the cap through the aperture 19 that is somewhat larger than the electrode. In this manner, during the welding, air or a compressed gas may be continuously discharged lengthwise along the electrode to blow away smoke or toxic fumes that may be generated during the welding operation. It will be appreciated that in the preferred form of construction the parts 10, 11 and 16 of the body are preferably formed of a moldable insulating material such as a synthetic resin plastic wherein all of the necessary cavities required to accommodate the mounting 17, the spring 27 and the contactor 26 are partially formed on opposite sides of the parting plane 12. In this manner it is possible to easily assemble the electrode holder and to disassemble it whenever occasion requires. Whenever an electrode E has been consumed the thumb screw 20 is merely loosened and the remaining portion of the electrode drops out of the socket 18. A new welding rod can then be easily substituted therefor.

It will be appreciated by those skilled in the art that the improved electrode holder is of relatively simple and durable construction and can be economically manufactured. It enables gas to be continuously discharged lengthwise along the electrode to blow away smoke and toxic fumes, and provides a trigger so arranged as to function as a visual indicator for indicating whether or not the electrode E is in circuit with the generator cable 31.

Various changes may be made in the details of construction without departing from the spirit and scope of the invention as defined by the appended claims.

I claim:

1. An energizing control for welding rod holders comprising a body of insulating material, a stationary contact on the body, an elongated conducting member comprising a pair of spaced spherical conductors connected by a rigid neck conducting portion, the body having a socket to receive one of the spherical conductors to swingably mount said elongated conducting member to permit swinging movement of the other spherical conductor toward the stationary contact for circuit making purposes and away from the stationary contact for circuit breaking purposes, a coil spring recessed in the body and engaging said other spherical conductor to urge the same toward the stationary contact and being restrained from lateral movement at the engaging end thereof by its fit on the spherical surface of said other spherical conductor, means for swinging the conducting member against the resistance of the coil spring, and means for connecting an electric supply cable to said one spherical conductor.

2. An energizing control for welding rod holders comprising a body of insulating material, a stationary contact on the body, an elongated conducting member comprising a pair of spaced spherical conductors connected by a rigid neck conducting portion, the body having a socket to receive one of the spherical conductors to swingably mount said elongated conducting member to permit swinging movement of the other spherical conductor toward the stationary contact for circuit making purposes and away from the stationary contact for circuit breaking purposes, a coil spring having an inside diameter less than the diameter of said other spherical conductor and being recessed in the body and engaging said other spherical conductor to urge the same toward the stationary contact and being restrained against lateral movement at the conductor engaging end thereof by its fit on the spherical surface of said other spherical conductor, means for swinging the conductor member against the resistance of the coil spring, and means on said one spherical conductor for connecting an electric supply cable to said one spherical conductor.

3. An energizing control for welding rod holders comprising a body of insulating material, a stationary contact on the body, an elongated conducting member comprising a pair of spaced spherical conductors connected by a rigid neck conducting portion, the body having a socket to receive one of the spherical conductors to swingably mount said elongated conducting member to permit the stationary contact for circuit making purposes and away from the stationary contact for circuit breaking purposes, a coil spring having an inside diameter less than the diameter of said other spherical conductor and being recessed in the body and engaging said other spherical conductor to urge the same toward the stationary contact and being restrained against lateral movement at the conductor engaging end thereof by its fit on the spherical surface of said other spherical conductor, means for swinging the conductor member against the resistance of the coil spring, said one spherical conductor being recessed to receive an electric supply cable, and means on said one spherical conductor for securing the electric cable to said one spherical conductor.

GUSTAVE HILLER.

REFERENCES CITED

The following references are of record in the file of this patent:

UNITED STATES PATENTS

| Number | Name | Date |
|---|---|---|
| 1,309,696 | Roberts et al. | July 15, 1919 |
| 1,794,133 | Anderson | Feb. 24, 1931 |
| 1,883,807 | McIntire | Oct. 18, 1932 |
| 1,938,438 | Petersen | Dec. 5, 1933 |
| 2,148,095 | Yettner | Feb. 21, 1939 |
| 2,200,322 | Arnesen | May 14, 1940 |
| 2,265,135 | Hackmeyer | Dec. 9, 1941 |
| 2,283,748 | Mathieu | May 19, 1942 |
| 2,373,598 | Reeb | Apr. 10, 1945 |
| 2,378,707 | Hiller | June 19, 1945 |
| 2,389,969 | Fadeley | Nov. 27, 1945 |

FOREIGN PATENTS

| Number | Country | Date |
|---|---|---|
| 516,902 | Germany | Jan. 29, 1931 |
| 704,956 | Germany | Apr. 10, 1941 |